Figure 1:
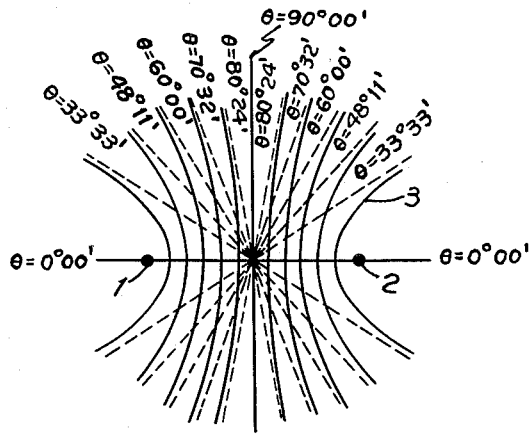

INVENTOR.
GEORGE D. HULST
ATTORNEY

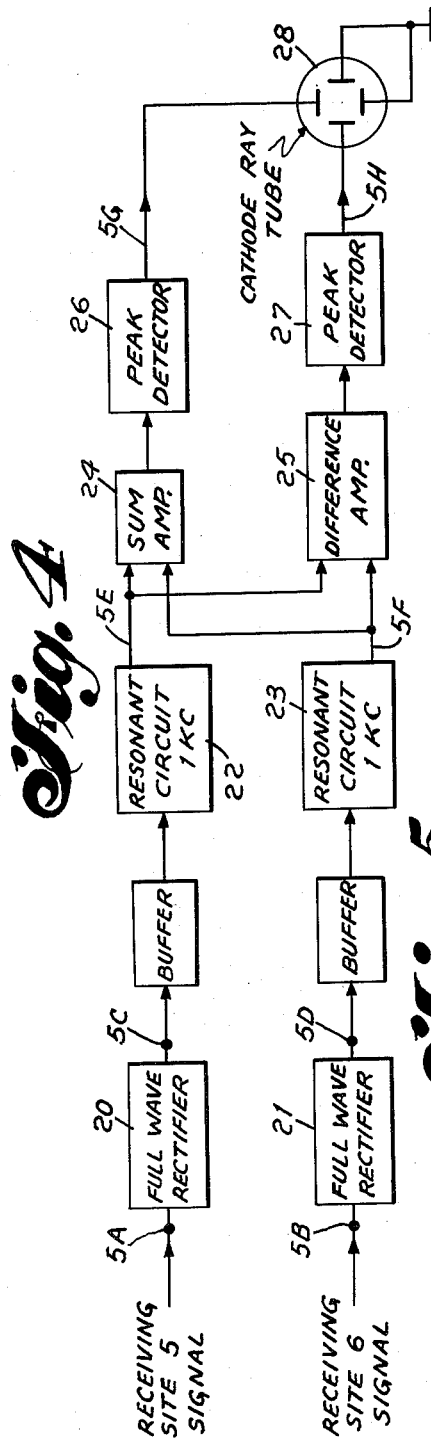
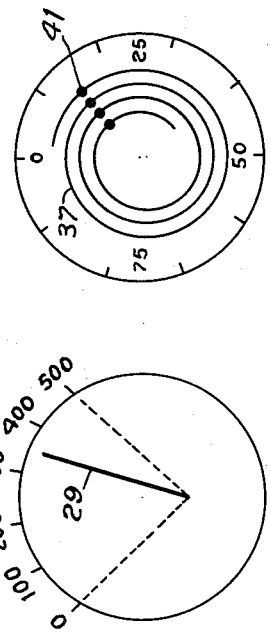
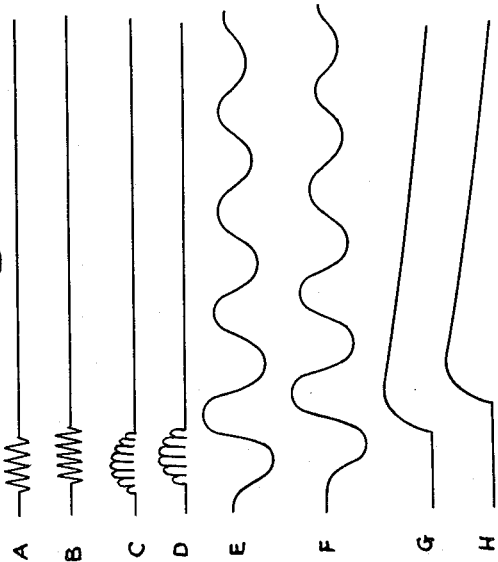

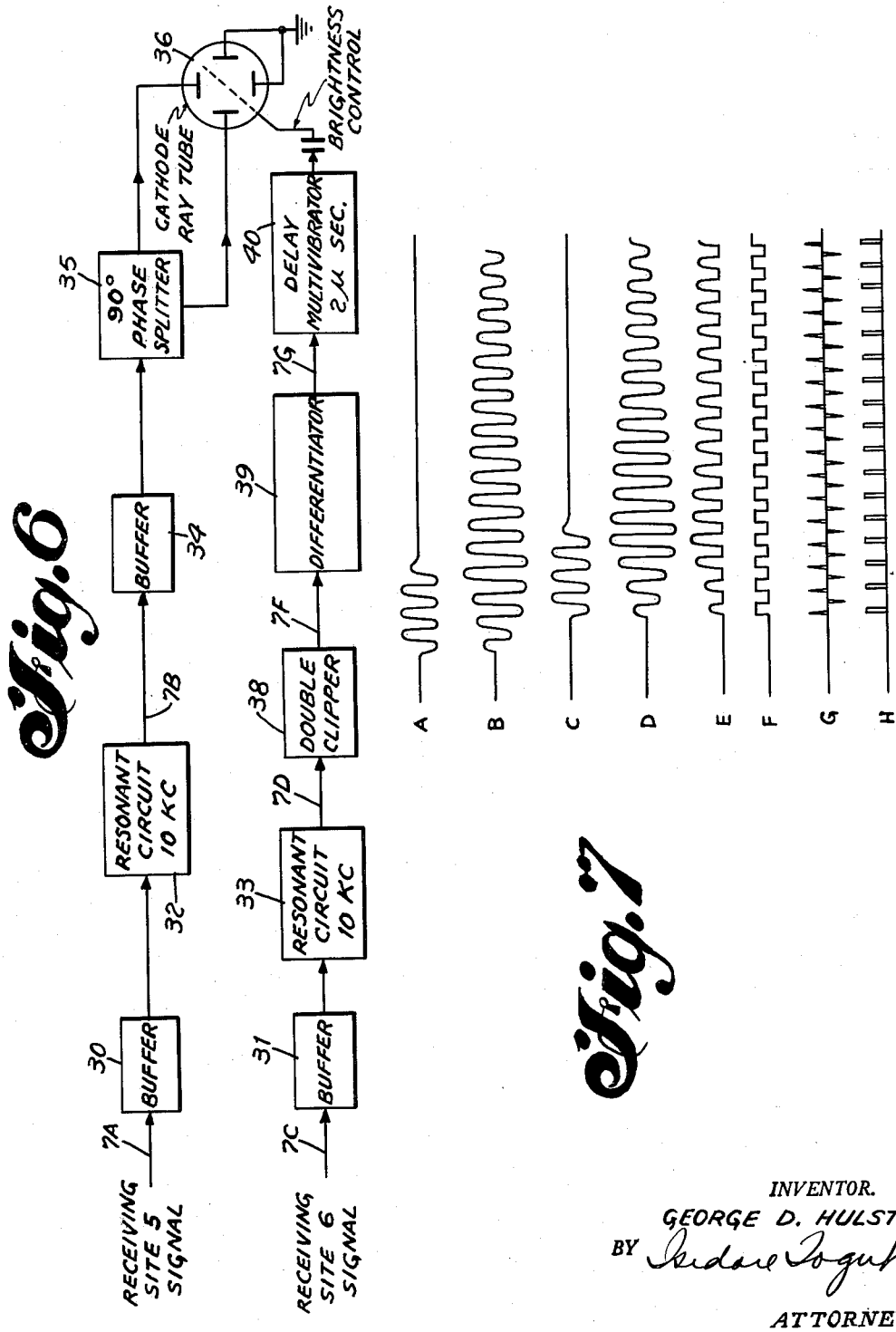

United States Patent Office 2,993,203
Patented July 18, 1961

2,993,203
RADIO DIRECTION FINDING SYSTEM
George D. Hulst, Verona, N.J., assignor to International Telephone and Telegraph Corporation, Nutley, N.J., a corporation of Maryland
Filed Oct. 14, 1959, Ser. No. 846,328
6 Claims. (Cl. 343—113)

This invention relates to radio direction finders and more particularly to a time difference direction finding system to provide a precise indication of the direction of arrival of pulsed electromagnetic signals.

Radio direction finding or location by means of time difference measurements is a technique of direction finding best suited to location of a radiating source whose radiation is characterized by occasional or intermittent action. Examples of such intermittent action, the direction of which it is desired to ascertain, are atmospheric electrical discharges or "sferics" and nuclear explosions. An intermittent source of electric disturbance sets in motion a spherical wavefront of electromagnetic radiation which travels outwardly at the speed of light. If the wavefront is detected at two or more receiving sites and an exact measurement arrival time at each site is made, information regarding the location of the source can be obtained. The problem is usually complicated by refractive and reflective effects of the earth's surface, atmosphere and ionosphere. In general, the first wave to arrive at a distant point from the initiation of a radiation pulse follows the earth's surface and is known in radio parlance as a ground wave. Its path, direction, and transit time are accurately predictable. Thus, a ground wave or the initial part of a received pulse provides a means for the reliable determination of position by time difference techniques.

The system of radio navigation known as Loran makes use of these ground waves to measure the location of a receiver by means of the difference of arrival times of pulses from two or more transmitters. The radio navigation counterpart of this system involves a single transmitter and a plurality of receivers. This system of radio navigation has been referred to on some occasions as "Inverse Loran." Actually, the technique of time difference DF (direction finding) might be considered the inverse of any kind of hyperbolic system of navigation of which Loran is one.

It is therefore an object of this invention to provide an improved direction finding system for pulsed radiation using a time difference technique.

It is a further object of this invention to provide a direction finding system for pulsed radiation using a time difference technique having improved resolution.

A feature of this invention is a radio direction finding system to determine the time difference between the electromagnetic radiations from a source of pulsed electromagnetic radiations which comprises first and second spaced antennas to receive the radiations. A first circuit converts the envelopes of the received radiations to a first group of sinusoidal signals and obtains from this first group of sinusoidal signals a coarse indication of the time difference between the arrival of the radiations at the first and second antennas. A second circuit converts the received radiations to a second group of sinusoidal signals and obtains from this second group of sinusoidal signals a fine indication of the time difference between the arrival of the radiations at the first and second antennas, the total of the coarse and fine time differences being a function of the angle of arrival of the radiations at the first and second antennas.

Figure 2:
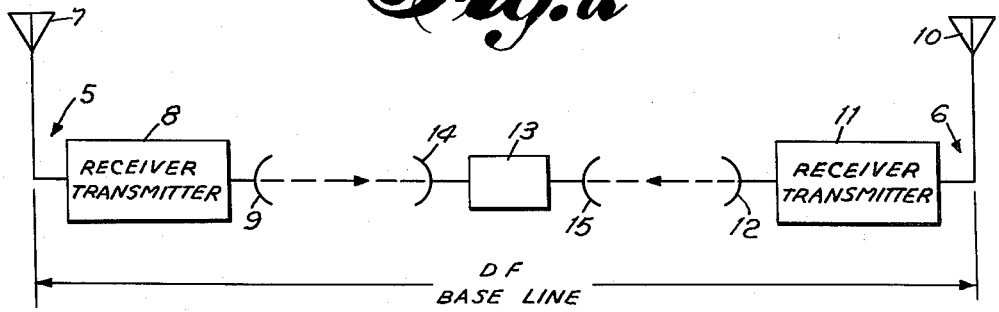
Figure 3:
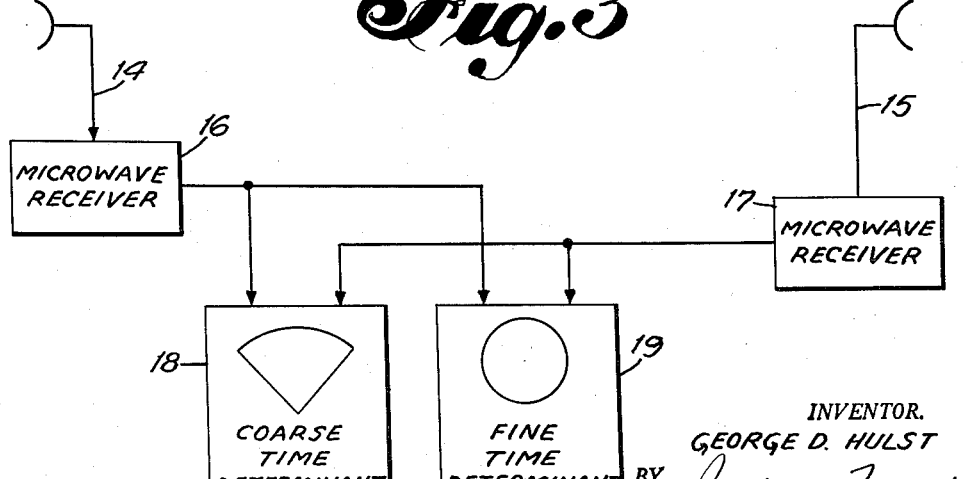

The above-mentioned and other features and objects of this invention will become more apparent by reference to the following description taken in conjunction with the accompanying drawings, in which:

FIG. 1 is a family of plane hyperbolae used in a Loran-type navigation system;
FIG. 2 is a block diagram of an embodiment of this invention with two receiving stations and one center station;
FIG. 3 is a block diagram of the center station;
FIG. 4 is a block diagram of one of the time determinant circuits used in this invention;
FIG. 5 is a graph of waveforms derived from the circuit of FIG. 3;
FIG. 6 is a block diagram of a second time determinant circuit used in this embodiment;
FIG. 7 is a graph of waveforms derived from the circuit of FIG. 5;
FIG. 8 is the cathode-ray tube display utilized for the circuit of FIG. 4; and
FIG. 9 is the cathode-ray tube display utilized for the circuit of FIG. 6.

Recent studies have shown that the vertical electrical field propagated at great distances from the source of atmospheric electrical discharges contain principally low frequnecy oscillations. Frequencies in the region of 200 to 2,000 cycles and 4,000 to 20,000 cycles show the least attenuation, while the low frequencies from 2,000 to 4,000 and the higher frequencies greater than 20,000 cycles are greatly attenuated. When the source of radiation to be located is a nuclear explosion, there are special considerations to be kept in mind. It has been noted and reported that radiation in a nuclear explosion is initiated by a rapid upward motion of a preponderance of negative changes. At short distances from the explosion a vertical antenna experiences an initial steep negative change followed by a positive recovery period. At longer distances the outwardly propagating signal gradually changes to a short wave train of sinusoids having an energy maximum between 8 and 20 kc. Over equal distances following parallel paths, forms of waves as a function of time bear a remarkable similarity to each other both in waveform and amplitude. This permits a more precise measurement to be made of arrival time.

Referring now to FIG. 1, there is shown receiving stations 1 and 2 which are the foci of hyperbolic lines 3, which represents lines of time difference similar to that used in a Loran-type navigation system. When the source of radiation is at a distance from the receiving sites 1 and 2 which is appreciably greater than the length of the base line, the hyperbolic locus of the source degenerates asymptotically into a cone whose apex lies at the midpoint of the base line. Under these conditions, the function of a hyperbolic system approaches the function of a true direction finder, with certain limitations, and certain peculiar advantages. The angle $\theta$ which this locus cone makes with the base line at large distances can be approximated by the formula:

$$\theta = \cos^{-1}\left(\frac{\Delta T \cdot C}{B}\right)$$

where $\Delta T$ is the time difference, C is the velocity of light corrected for earth's curvature, and B is the length of the base line. It is to be noted that $\theta$ is more accurately defined in terms of a measurement of $\Delta T$ at angles of $\theta$ in the vicinity of 90 degrees and that it becomes indeterminant at values of $\theta$ approaching zero degrees or 180 degrees. This limitation is entirely general and applies to any time difference direction finding system.

With reference to FIG. 2, there is shown receiving stations 5 and 6 which are spaced apart on a base line extension, for example, 500 microseconds length, which represent 81 nautical miles. Receiving station 5 has an antenna 7 and a receiver and transmitter 8 with a microwave transmitting antenna 9. The receiving station 6 has a receiving antenna 10, receiver transmitter 11 and a transmitting microwave antenna 12. Receiving antenna 7 and 10 are of course adapted to receive low frequency waves, such as are transmitted by sferics and nuclear explosions. Each of the receivers of stations 5 and 6 are adapted to receive very low frequencies and the respective transmitters of stations 5 and 6 are microwave transmitters to transmit the very low frequency information received by the receiving sites 5 and 6 to the center receiving and processing station 13. Each microwave transmitter uses frequency modulation and should be capable of passing a 5 to 70 kc. band of modulation frequencies, with a 6 db per octave roll off of response at each end of the band for optimum transient response. The center station 13 has a microwave receiving antenna 14 directed to receive signals transmitted by the microwave transmitting antenna 9 and a microwave receiving antenna 15 which is oriented to receive signals transmitted by the microwave transmitting antenna 12 from receiving station 6. Each of the microwave receivers (not shown) in the center station 13 associated with the receiving microwave antennas 14 and 15 is designed to receive and pass a panel of modulation frequencies from D.C. to 70 kc. The base line length of 500 microseconds utilized in the illustration is by way of example only and it is obvious that other longer or shorter base line lengths may be used as warranted. In this particular case of 500 microseconds base line length, zero microseconds represents a direction of signal directly in line with the two receiving sites 5 and 6 and passing from the 5 receiving site to the receiving site 6. The maximum end of the scale represents a direction of signal in the opposite direction passing from receiving site 6 to receiving site 5. The center of the scale at 250 microseconds represents a direction at right angles to the base line where the most accurate measurements of arrival angle can be made.

FIG. 3 shows in more detail the component units of the center receiving station 13. Microwave receiving antenna 14 as indicated above is directed in such a direction as to receive the signals transmitted by the microwave and transmitting antenna 9 and these signals are fed into a microwave receiver 16. The microwave receiving antenna 15 receives the signals from transmitting antenna 12 and the received signals are fed into microwave receiver 17. The waveforms thus received from the receiving sites 5 and 6 are then demodualted and are fed to coarse time determinant circuit 18 and fine time determinant circuit 19.

The coarse time determinant circuit 18 displays for visual observation the direction of arrival using envelope matching techniques on the coarse scale of the order of 500 microseconds depending upon length of the base line at the receiving site as used in this example. The coarse time determinant circuit 18 is closely related to the circuit disclosed in the patent application of O. S. Meixell entitled "Radio Direction Finding System," filed January 10, 1958 and bearing Serial No. 708,331, now Patent No. 2,928,089 issued March 8, 1960. The coarse time determinant circuit is shown more in detail in the block diagram of FIG. 4. The signals from receiving sites 5 and 6 are shown as waveforms A and B in FIG. 5. The received waves 5A and 5B pass through cathode-follower buffers (not shown) to full wave rectifiers 20 and 21. The output of the rectifiers 20 and 21 are the waves 5C and 5D. The rectified waves 5C and 5D are amplified and fed respectively to high Q resonant circuits 22 and 23 precisely tuned to a frequency of 1 kilocycle per second. This frequency has been chosen low enough to avoid ambiguity in the measurable angles of Θ and is high enough to discriminate between successive signals. It is estimated that by using compact toroidal coils a Q of 100 can be realized at this frequency without difficulty. At this frequency and with this Q the direction of signal would be observable for several tenths of a second. The occurrence of the received signal in effect shock excites the tuned circuits 22 and 23 which continue to oscillate at an exponentially decaying amplitude whose decrement is one-tenth of a second. The exponentially decaying sinusoidal waves are shown as waveforms 5E and 5F. Arrival time has thus been transformed to a phase angle between these two waves. The output of the resonant circuits 22 and 23 are then fed to sum and difference amplifiers 24 and 25, and the sum and difference voltages are thus derived from the waves 5E and 5F and the amplitudes of these derived sinusoids, the ratio of which cary the information of arrival time are monitored peak reading rectifiers 26 and 27. The outputs of the peak detectors 26 and 27 are the waveforms 5G and 5H. These waves are then applied to the deflection plate of a cathode-ray display tube 28. After a brief initial transient the cathode-ray beam will trace a slow straight radial line 29 whose direction is an exact measure of pulse envelope arrival time as shown in FIG. 8. In order to be accurately operative at all points in the time scale, the relative amplitude of the waves 5A and 5B must be preserved from the time of their reception.

The fine time determinant circuit is shown in more detail in the block diagram of FIG. 6 but utilizes the technique of waveform matching as distinguished from the envelope matching of the coarse time determinant circuit for most accurate results. Any correlation technique using the waveforms directly will have a maximum correlation at the point of exact time synchronism. Measurement of exact time differences is complicated by the presence of minor lobes in the correlation function at time intervals approximating the integral multiples of the reciprocals of the dominant freqnencies. In the case of nuclear explosion waves, the frequency of the dominant energy approximates 10 kc. The fine time determinant circuit in effect represents an interpolation device by utilizing the actual cycles of the received waveform instead of the envelope. Its display is also of the cathode-ray type but, in this case, the pattern formed is a spiral whose radius depends upon the amplitude of the received signal. A bright spot indicative of the relative arrival time of 10 kc. components of the two received signals appears on all traces of the spiral at a constant angle from the center. Although not all of the arrival time information is utilized, the reported waveforms have a major if not a maximum portion of their total contained energy at 10 kc. The input signals 7A and 7C are introduced through buffers 30 and 31 to high Q resonant circuits 32 and 33 identically tuned to 10 kc. and producing the decaying sinusoids 7B and 7D, respectively. The decrement in this case is 1/100 of a second. The sinusoidal wave 7B is introduced through a buffer 34 to a 90 degree phase splitting network 35 which produces resultant sinusoids having a 100 microsecond period and a phase difference of 90 degrees. The output of the phase splitter 35 is then fed to the vertical and horizontal deflection plates of a cathode-ray oscilloscope 36. If the amplitude of the sinusoid 7B were constant, the resultant trace would be circular. However, the sinusoid 7B decays in amplitude after the initial transient and hence, a spiral trace 37 is generated as shown in FIG. 9 whose period of revolution is precisely 100 microseconds and whose radius decreases with a time constant of 1/100 of a second. Decaying sinusoid 7D is clipped in the double clipper 38 at its precise center to form the indicated half sine wave 7E. It is then amplified and clipped again producing an even trapezoidal wave 7F which is the output of the double clipper 38. This wave is differentiated in differentiator 39 to produce the differentiated wave 7G and is used to trigger a monostable multivibrator 40 whose two microsecond output pulse 7H is capacitively fed to the control grid of the cathode-ray tube 36. This produces a bright dot of two microseconds duration shown in FIG. 8 as dot 41 on one trace which is repeated on each succeeding spiral of the trace. The angle at which the dot occurs is constant and is a precise measure of the time relationship betwen the 10 kc. components of the two received waves integrated over the period of the decrement. This precise measurement, however, does not depend upon the preservation of the amplitude of the original wave. The display of the fine time trace can be operated in any one of two ways as known to those skilled in the art. Either the spiral can be blanked out at times other than the occurrence of the two microsecond pulse or else it can be made readable. It appears that a spiral trace of low brightness is preferable so that the received signal can be observed at all times. In the absence of noise, it is considered that time comparisons on the fine time determinant scale can be made to an accuracy better than one microsecond with the 360 degrees of display phase corresponding to a measured time difference of 100 microseconds. In the presence of noise, the measurement will be in error in accordance with the 10 kc. component of noise present at the time of arrival of the received wave. This error is inherent in any system where a simple measurement is made in the presence of noise. In determining, therefore, the total reading for the direction of arrival of the received wave, the coarse time determination is first made on the cathode-ray tube 36 and the interpolation for the fine time determination between the major graduations on cathode-ray tube 36 is made on the cathode-ray tube 36. After having ascertained the total time difference from the two display tubes, the correct angle of arrival of the received waves can be derived from the equation.

A more cogent elaboration of the direction finding technique of this invention would be to utilize a plurality of sampling frequencies and to compile therefrom a composite average arrival time, the average being weighed in accordance with the relative energies of the various frequency components. Such a technique is directly compatible with and readily adapted to this invention. However, in the interest of both time and economy only one frequency component may be utilized. It is understood, of course, the 10 kc. frequency as specified in the description of the embodiments of this invention is by way of illustration only and other frequency components can readily be used instead.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radio direction finding system to determine the time difference between electromagnetic radiations from a source of pulsed electromagnetic radiations, comprising first and second spaced antenna means to receive said radiations, first means to convert the envelopes of said radiations received by said first and second antennas to a first group of sinusoidal signals, means to obtain from said first group of sinusoidal signals a coarse indication of the time difference between the arrival of said radiations at said first and second antennas, second means to convert said radiations received by said first and second antennas to a second group of sinusoidal signals, means to obtain from said second group of sinusoidal signals a fine indication of the time difference between the arrival of said radiations at said first and second antennas, the total of said coarse and fine time differences being a function of the angle of arrival of said radiations at said first and second antennas.

2. A radio direction finding system according to claim 1 wherein said means to obtain from said second group of sinusoidal signals said fine indication of time differences comprises means to compare the waveform of each of said sinusoidal signal associated with said first antenna with the waveform of the corresponding signal of said second group of sinusoidal signals associated with said second antenna to derive the time difference therebetween.

3. A radio direction finding system according to claim 1 wherein said second means to convert said radiations received from said first and second antennas to said second group of sinusoidal signals include means to receive said radiations, a first resonant circuit, a first buffer circuit coupling said received radiations from said first antenna to said first resonant circuit whereby said radiations received at said first antenna are converted to a first train of damped sinusoidal waves, a second resonant circuit, a second buffer circuit coupling said received radiations from said second antenna to said second resonant circuit whereby said radiations received at said second antenna are converted to a second train of damped sinusoidal waves.

4. A radio direction finding system according to claim 3 further comprising a quadrature phase splitter, a third buffer circuit coupling said first train of damped sinusoids to said quadrature phase splitter to produce as the output of said phase splitter third and fourth trains of damped sinusoidal waves having a phase difference therebetween of 90 degrees, a cathode-ray discharge device, means coupling said third train of damped sinusoidal waves to the horizontal deflection plates of said cathode-ray discharge device, means coupling said fourth train of damped sinusoidal waves to the vertical deflection plates of said cathode-ray discharge device whereby there is produced on the screen of said cathode-ray discharge device a spiral trace, whose period of revolution is equal to the decrement of said first train of damped sinusoidal waves and whose radius decreases with a time constant equal to the reciprocal of said decrement.

5. A radio direction finding system according to claim 4 further comprising means to convert said second train of damped sinusoidal waves to a pulse train having a pulse period equal to the period of said second train of damped sinusoidal waves and each pulse of said pulse train pertains to a corresponding cycle of said second train of damped sinusoidal waves, means coupling said pulse train to the control grid of said cathode-ray discharge device whereby the occurrence of each said pulse is indicated on said screen on a portion of said spiral denoting a corresponding cycle of said first train of damped sinusoidal waves, the locus of said pulse indications denoting the fine time difference between said radiations received at said first and second antennas.

6. A radio direction finding system to determine the time difference between electromagnetic radiations from a source of electromagnetic radiations comprising first and second spaced antenna means to receive said radiations, a first resonant circuit, a first buffer circuit coupling said received radiations from said first antenna to said first resonant circuit whereby said radiations received at said first antenna are converted to a first train of damped sinusoidal waves, a second resonant circuit, a second buffer circuit coupling said received radiations from said second antenna to said second resonant circuit whereby said radiations received at said second antenna are converted to a second train of damped sinusoidal waves, a quadrature phase splitter, a third buffer circuit coupling said first train of damped sinusoids to said quadrature phase splitter to produce as the output of said phase splitter third and fourth trains of damped sinusoidal waves having a phase difference therebetween of 90 degrees, a cathode ray discharge device, means coupling said third train of damped sinusoidal waves to the horizontal deflection plate of said cathode ray discharge device, means coupling said fourth train of damped sinusoidal waves to the vertical deflection plates of said cathode ray discharge device whereby there is produced on the screen of said cathode ray discharge device a spiral trace whose period of revolution is equal to the decrement of said first train of damped sinusoidal waves and whose radiations decrease with a time constant equal to the reciprocal of said decrement, means to convert said second train of damped sinusoidal waves to a pulse train having a pulse period equal to the period of said second train of damped sinusoidal waves and each pulse of said pulse train pertains to a corresponding cycle of said second train of damped sinusoidal waves, means coupling said pulse train to the control grid of said cathode ray discharge device whereby the occurrence of each said pulse is indicated on said screen on a portion of said spiral denoting a corresponding cycle of said first train of damped sinusoidal waves, the locus of said pulse indications denoting the time difference between said radiations received at said first and second antennas.

References Cited in the file of this patent

UNITED STATES PATENTS

| | | |
|---|---|---|
| 2,403,626 | Wolff et al. | July 9, 1946 |
| 2,811,718 | Frank | Oct. 29, 1957 |
| 2,940,076 | Bissett et al. | June 7, 1960 |